(No Model.)
W. H. BARNUM.
LOG CHUTE.
No. 264,607. Patented Sept. 19, 1882.
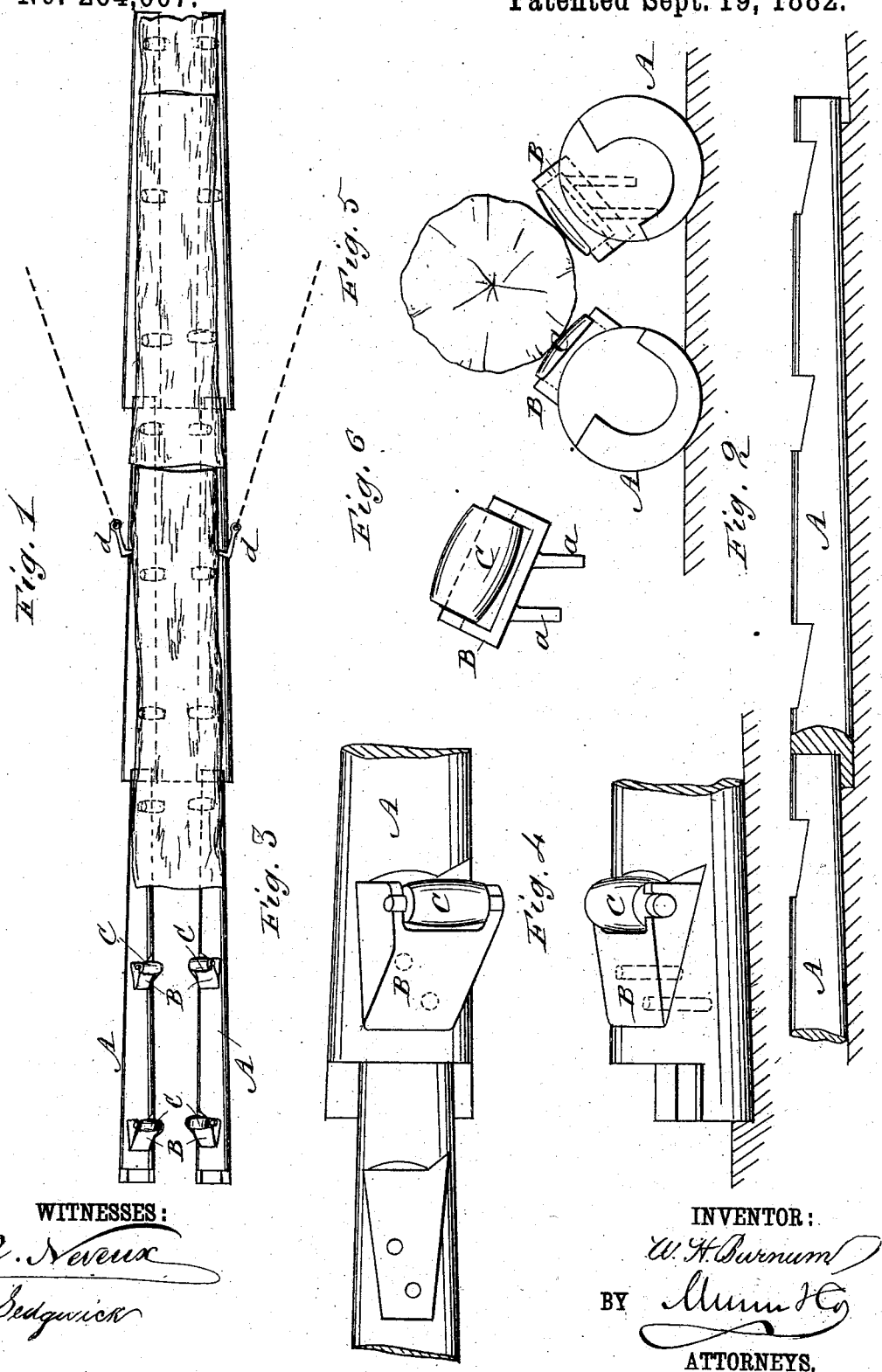
WITNESSES:
C. Neveux
C. Sedgwick
INVENTOR:
W. H. Barnum
BY Munn & Co
ATTORNEYS.

UNITED STATES PATENT OFFICE.

WILLIAM HENRY BARNUM, OF RENO, NEVADA.

LOG-CHUTE.

SPECIFICATION forming part of Letters Patent No. 264,607, dated September 19, 1882.

Application filed June 2, 1882. (No model.)

*To all whom it may concern:*

Be it known that I, WILLIAM HENRY BARNUM, of Reno, in the county of Washoe and State of Nevada, have invented a new and Improved Log-Chute, of which the following is a full, clear, and exact description.

My improvements relate to chutes for moving saw-logs, which, as usually constructed, consist of bare poles which have to be kept well greased in order that the logs may be moved. This greasing is expensive, especially when the chute is extended a long distance, and the labor of keeping the chutes in proper condition is an additional expense.

The object of my invention is to obviate these difficulties; and it consists in the combination of rollers with the ways of the chutes, as hereinafter described and claimed.

Reference is to be had to the accompanying drawings, forming a part of this specification, in which similar letters of reference indicate corresponding parts in all the figures.

Figure 1 is a plan view of my improved chute. Fig. 2 is a sectional side view of the same. Figs. 3 and 4 are plan views, showing the ways in larger size. Fig. 5 is an end view of the chute, and Fig. 6 is a side view of one of the rollers and its box.

In the construction of my improved chute I prefer to use trees of comparatively small size, and to use them unhewn. These trees or logs are laid upon the ground side by side to form the ways A, as illustrated in Figs. 1 and 5, a suitable distance apart, and with their butt-ends more or less in the ground in order to bring the upper surfaces as nearly level as possible. The butt-ends are halved and rabbeted, and the rabbet cut out in grooved form, as shown most clearly in Fig. 5, in order to receive the smaller end of the next log forming the chute. The upper sides are then cut out to receive the boxes B of the rollers C. These boxes B are made of metal, of a form for receiving the rollers, which rollers are of suitable size. The boxes are provided with the pins *a* for entering holes bored in the logs, so that they are held securely in place.

A chute constructed in this manner may be continued to any desired distance by duplication of the ways provided with rollers, as described.

In operation the logs to be moved are barked on the under side and placed upon the chute, supported by the rollers. If two or more logs are to be moved at once, they are placed one in front of the other upon the chute and loading-hooks, as shown at *d* in Fig. 1, are caught into the rear log. The team is then connected to the ropes or chains of the loading-hooks and the logs drawn along. The rollers C are a complete substitute for the grease usually employed. The logs are much more easily moved, the rollers are durable, and the expense of grease and the labor of applying it is entirely saved.

Having thus described my invention, I claim as new and desire to secure by Letters Patent—

1. The boxes B, carrying rollers C, in combination with the logs A A of the chute, substantially as shown and described.

2. The roller-boxes B, provided with pins *a a*, in combination with the ways A, cut out or recessed to receive the boxes, substantially as shown and described.

WILLIAM HENRY BARNUM.

Witnesses:
M. I. DILLMAN,
C. C. CHASE.